(12) United States Patent
Wechsler

(10) Patent No.: US 12,326,951 B2
(45) Date of Patent: Jun. 10, 2025

(54) MEDIA RECORDING AND PLAYBACK SYSTEM EMPLOYING TWO-DIMENSIONAL BAR CODES

(71) Applicant: John Leonard Wechsler, Fishers, IN (US)

(72) Inventor: John Leonard Wechsler, Fishers, IN (US)

( * ) Notice: Subject to any disclaimer, the term of this patent is extended or adjusted under 35 U.S.C. 154(b) by 320 days.

(21) Appl. No.: 17/849,013

(22) Filed: Jun. 24, 2022

(65) Prior Publication Data

US 2022/0414251 A1    Dec. 29, 2022

Related U.S. Application Data

(60) Provisional application No. 63/214,333, filed on Jun. 24, 2021.

(51) Int. Cl.
*G06F 21/62* (2013.01)
*G06K 7/14* (2006.01)

(52) U.S. Cl.
CPC ....... *G06F 21/6218* (2013.01); *G06K 7/1417* (2013.01)

(58) Field of Classification Search
CPC ............ G06F 21/6218; G06F 21/6209; G06K 7/1417
USPC .......................................................... 726/28
See application file for complete search history.

(56) References Cited

U.S. PATENT DOCUMENTS

| | | |
|---|---|---|
| 9,053,198 B2 | 6/2015 | Harrison |
| 9,699,299 B1 | 7/2017 | Pereira |
| 2012/0209686 A1 | 8/2012 | Horowitz |
| 2013/0036162 A1 | 2/2013 | Koenigs |
| 2014/0032328 A1 | 1/2014 | Greenfield |
| 2014/0299662 A1 | 10/2014 | Harrison |
| 2015/0046287 A1 | 2/2015 | Libin |
| 2017/0360234 A1* | 12/2017 | Simon .................. B32B 27/304 |
| 2018/0018726 A1 | 1/2018 | Callinan |
| 2018/0129844 A1 | 5/2018 | Rothschild |
| 2020/0106727 A1 | 4/2020 | Hsu |
| 2022/0398289 A1 | 12/2022 | Armstrong |
| 2022/0401192 A1* | 12/2022 | Marks ................. A61C 9/0053 |

OTHER PUBLICATIONS https://web.archive.org/web/20200929190831/https://ecardify.io/services/recordable-qr-codes Ecardify Recordable QR codes (Year: 2020).*
Website ecardify.io from the Internet Archive. Sep. 20, 2020.
Clipjoy.com—Website form the Internet Archive Dec. 2021.

* cited by examiner

*Primary Examiner* — Benjamin A Kaplan

(57) ABSTRACT

A system is described for associating a media file with an identifier. An identifier may be encoded as a physical and/or virtual label which may be affixed to a physical object and/or incorporated into an electronic document. When a request is received which comprises the identifier, a response in the form of a media file may be delivered. Access privileges associated with a request may be determined based on criteria such as elements of the label, membership in a group of labels, a target object type, geographic data and/or sensor data included in a request.

20 Claims, 11 Drawing Sheets

MEDIA RECORDING AND PLAYBACK SYSTEM EMPLOYING TWO-DIMENSIONAL BAR CODES

BACKGROUND

There are many well-known internet web sites which allow for users to upload media files, such as photographic images, audio recordings and/or video recordings having both images and sound. Such websites typically allow either a subset of users or the general public access to the uploaded files.

Two-dimensional bar codes, also sometimes referred to as matrix bar codes, are also well-known. Quick Response codes, i.e., QR codes, are one well-known example of a type of two-dimensional bar code. The use of QR codes has become common in consumer advertising where consumers will scan a QR code using the camera of their smartphone. The QR code can then be converted into a Uniform Resource Locator (URL) code, i.e., an internet address, which is then accessed by a browser.

QR codes have become popular as a form of machine readable visual code since the implementation of QR code recognition and browser launch of the associated URL was introduced in iOS 11 in June 2017. Android soon followed with Version 8.0 (Oreo) in August 2017.

SUMMARY

The present invention provides a novel system for the recording and playback of media files that integrates the use of a machine readable image such as a two-dimensional bar code. A 2D bar code is used to associate an identifier or code with an object. The identifier may be printed on a label and/or sticker which is attached to an object and/or may be printed, engraved and/or otherwise added to an object. An object may be a physical article such as a greeting card, business card, a sign board, packaging, a ticket, and/or may be an electronically distributed article such as an email, website, and/or similar electronic media.

The invention comprises in one form thereof, a system wherein one or more visual images, e.g., two-dimensional ("2-D") bar codes, are provided to a user. After scanning the visual image, the user records a media file. After the recording is complete, the media file will be played when the visual image is scanned, and/or the relevant URL is accessed. The user then applies the visual image to a selected object. One or more other users may then scan the visual image which will then result in the playback of the recorded media file. In an embodiment, the visual image takes the form of a 2-D bar code such as a QR code. The media file may advantageously take the form of a video file with both visual and audio data however it may also take the form of one or more still images. an audio recording, and/or be associated with a response from a server device which is mapped to the relevant URL.

In an embodiment a person will be able to purchase a booklet having one or more such 2-D bar codes printed on stickers. The 2-D bar codes could then be applied to a greeting card. The purchaser of the booklet could then record a personalized message for the recipient of the greeting card which the recipient would be able to playback by scanning the 2-D bar code sticker attached to the greeting card. Alternatively, greeting cards having such 2-D bar codes printed as an integral part of the card could be provided.

A booklet of such 2-D bar codes, or visual images could also be employed for other purposes. For example, a real estate agent might place such stickers throughout a real estate listing so as to be able to offer contactless showings or to provide a tour via a series of videos and highlight features of the property. Any number of other applications are also possible.

The system comprises, in another form thereof, a system wherein a single URL code is associated with a particular visual code and with both the recording of a media file and the playback of that media file. In such a system, instead of, or in addition to, providing the user with the option to upload a previously recorded media file, the user would initially scan the 2-D bar code and then have the ability to record a media file locally on their smart phone or other comparable device and then upload the media file. The media file would then be immediately associated with the URL code of the visual code.

The system may comprise, in an embodiment, a system wherein a plurality of distinct visual codes and/or identifiers are provided and all of them access the same URL. Each of the separate visual codes allow for a user to record a media file accessible via the URL which may be presented as a webpage. This many-to-one embodiment can be particularly useful for events. For example, such many-to-one stickers could be provided to the guests at a wedding with each of the guests recording a message during the event. The hosts, and other guests, would then be able to view the collected set of messages at a single location on the internet. It is also envisioned that a human readable indicator of a visual code may indicate an organizational paradigm which may determine access rights of a user associated with a visual code.

Other applications of such a many-to-one application are also possible. For example, trade shows and conventions could utilize such a system to allow sponsors to post and/or modify a message at a common location which would be readily accessed by a user action associated with detection of a visual code by a user device.

In another application, a person would be able to record an "in case of emergency" media file with special instructions or data concerning that person, such as information about medical conditions, medical prescriptions, contact information, etc. Stickers corresponding to this information could then be affixed to that person's drivers license, car registration, a pendant, wrist band, an employer issued ID tag, or other suitable location.

In yet another application, a still image or video ID tag for a pet could be recorded with relevant information, such as contact information, and affixed to a dog collar or a tag attached to a dog collar.

It is envisioned that a visual code indicator (e.g., a sticker) may also comprise additional information which is not encoded in a URL associated with the visual code. For example, a Personal Identification Number (PIN) might be added to a sticker, or printed with the sticker which would be used to determine whether a user accessing a particular URL has various rights to read, modify, delete, etc. media which is accessible via the URL. While 2D bar codes and QR are used as an exemplary visual image which may be interpreted automated processing of an image, other types of visual images might be used within the spirit and scope of the embodiments herein.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Figure 1:
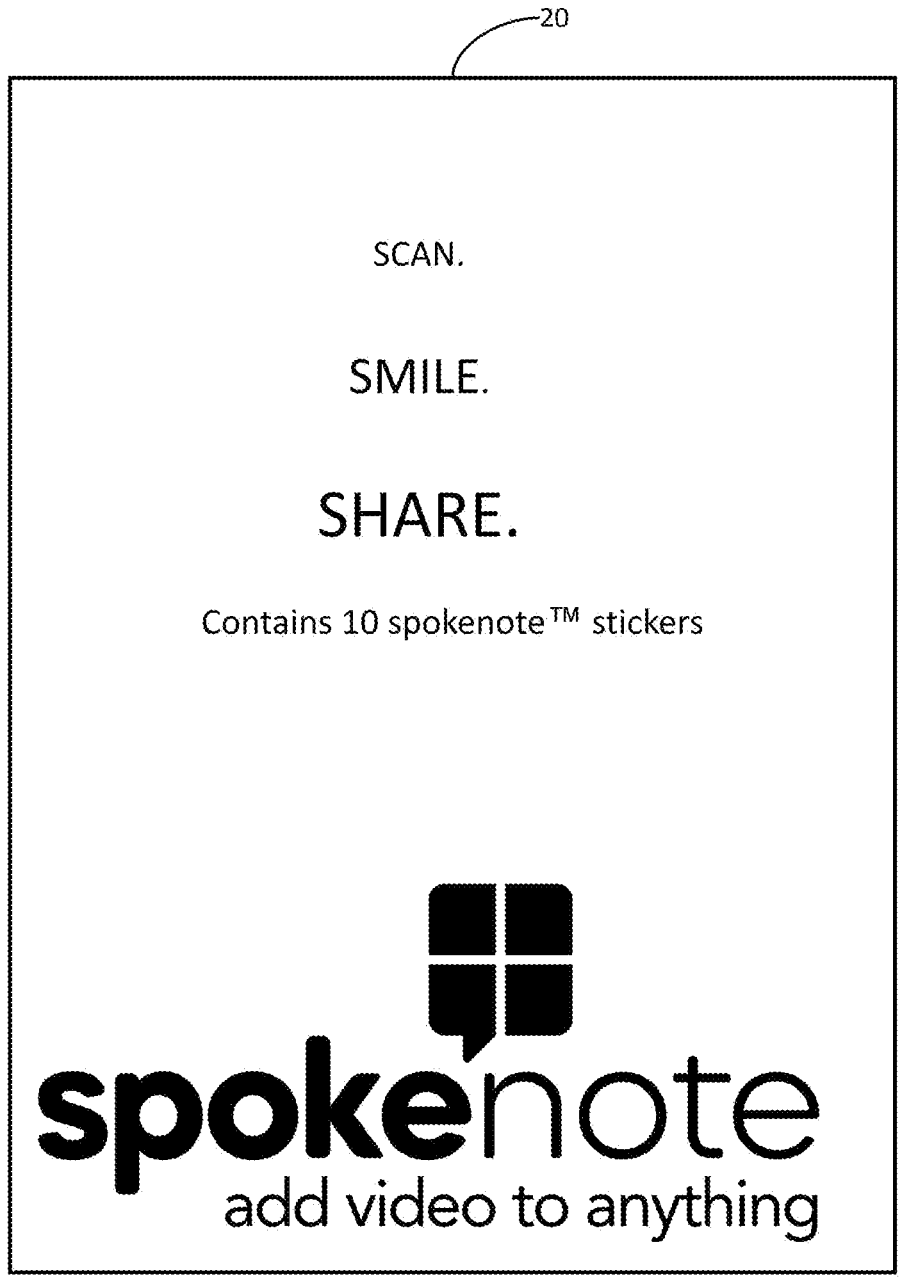
FIG. 1 is a diagram of a booklet containing stickers with 2-D bar codes.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the system and methods to the precise forms disclosed.

DETAILED DESCRIPTION

In a first embodiment depicted in FIGS. 1-5, a packet 20 having a plurality of stickers 22 is provided. Each of the stickers 22 has a 2-D bar code 24 printed thereon. In the illustrated embodiment, the packet 20 is a booklet having a plurality of pages with each page having a separate sticker with a visual image containing information linking it to a specific URL. One type of such a visual image is a 2-D bar code 24. The 2-D bar code 24 takes the form of a QR code in the illustrated embodiment.

Figure 2:
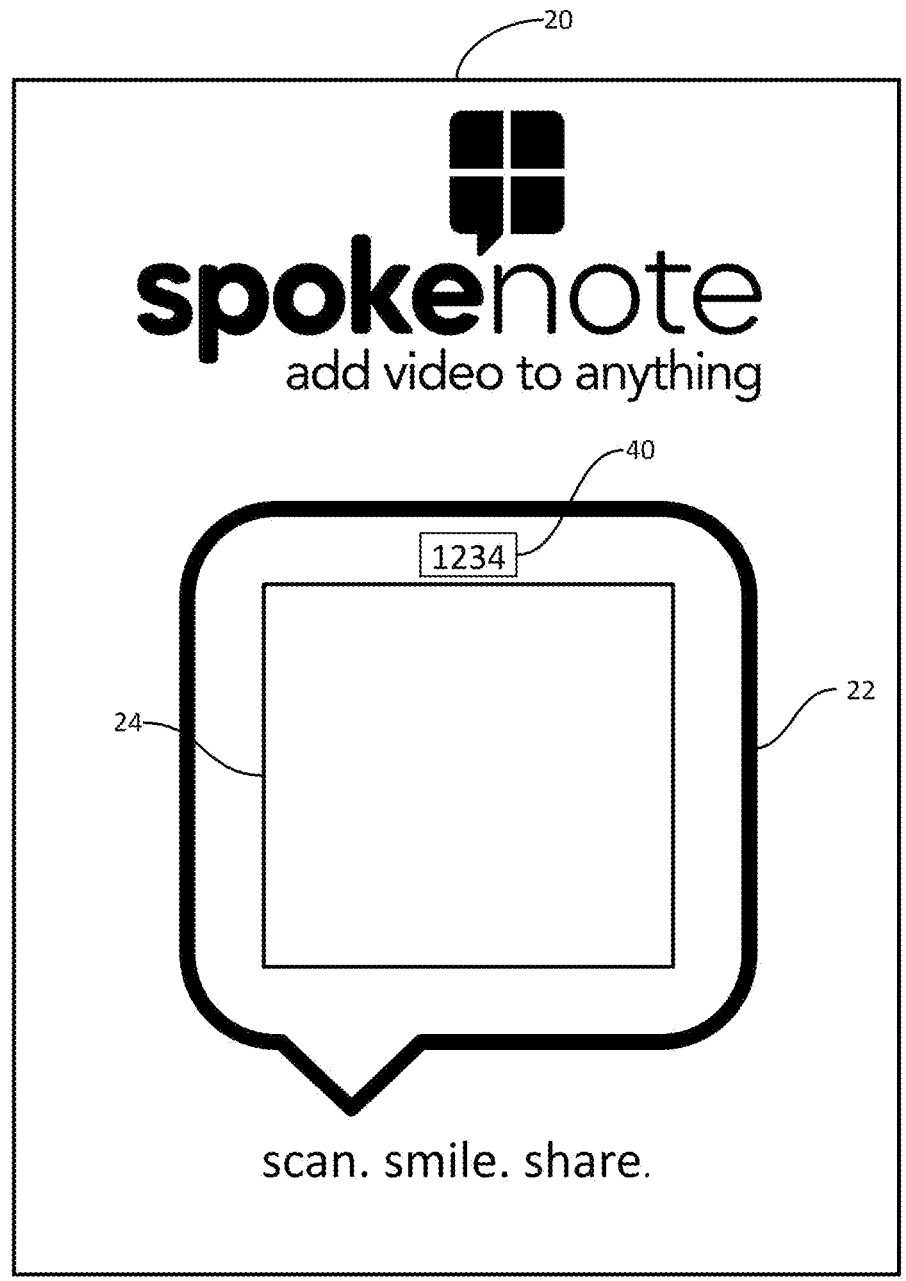
FIG. 2 is a diagram of a page of a booklet with a 2-D bar code sticker.
Figure 3:
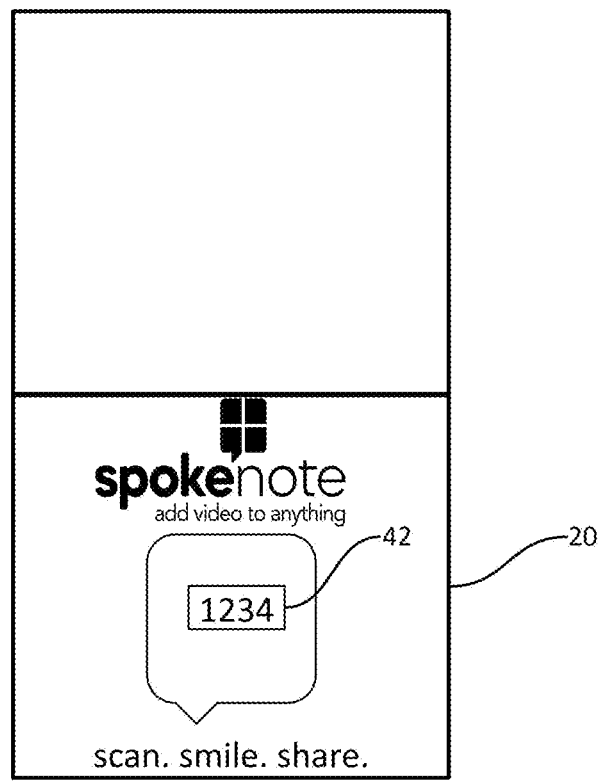
FIG. 3 is an illustration of a sticker removed from a booklet.
Figure 3:
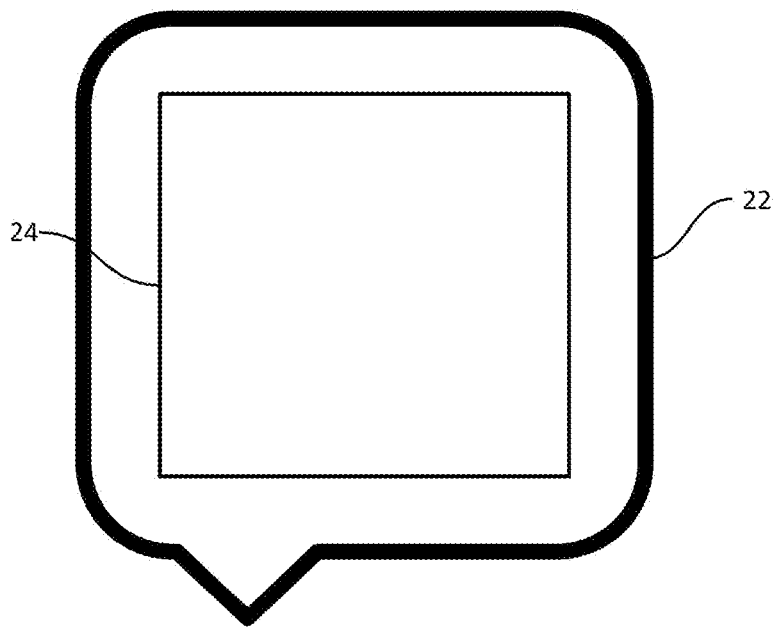
Figure 4:
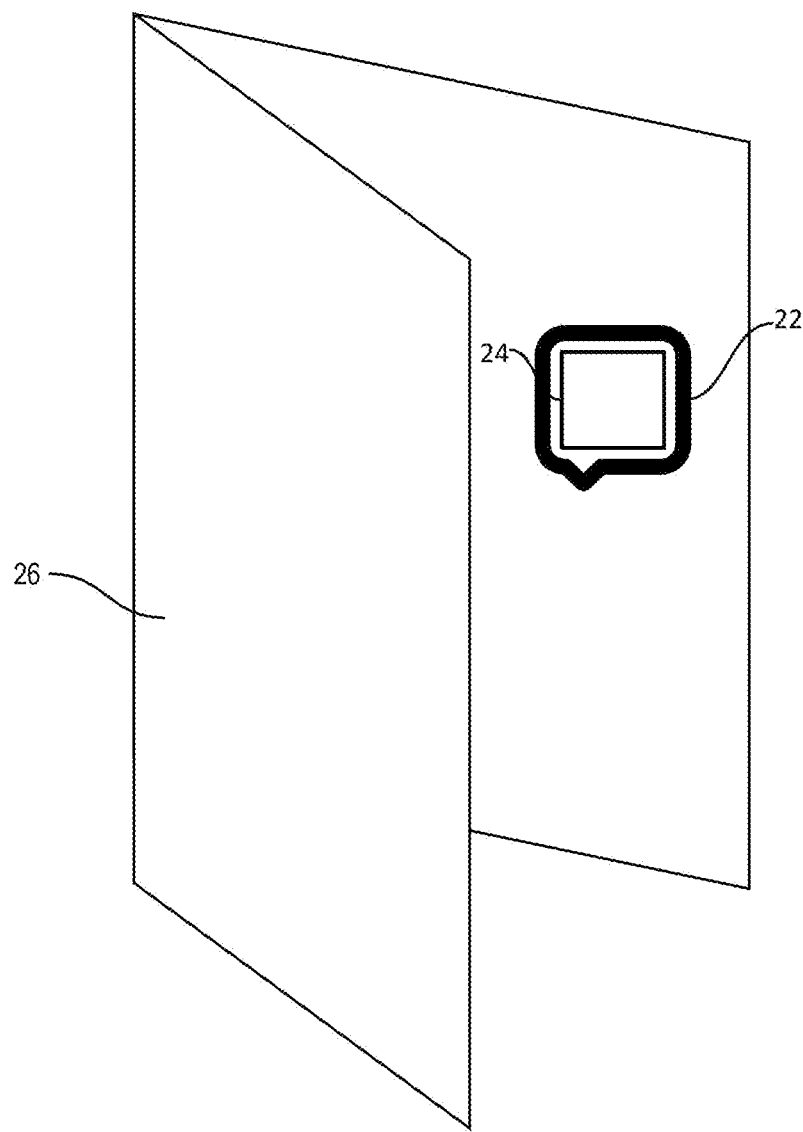
FIG. 4 is a perspective view of a greeting card with a 2-D bar code.

The stickers 22 have an adhesive layer that releasably secures them to the packet and which allows them to be attached to another tangible object. FIGS. 1-3 are schematic illustrations of a packet 20 in the form of a small booklet having a plurality of pages, wherein pages incorporate a separate 2-D bar code and sticker. FIG. 3 shows one of the stickers 22 after it has been removed from the booklet 20. FIG. 4 schematically depicts a greeting card 26 having the sticker 22 with the 2-D bar code 24 attached thereto.

Figure 5:
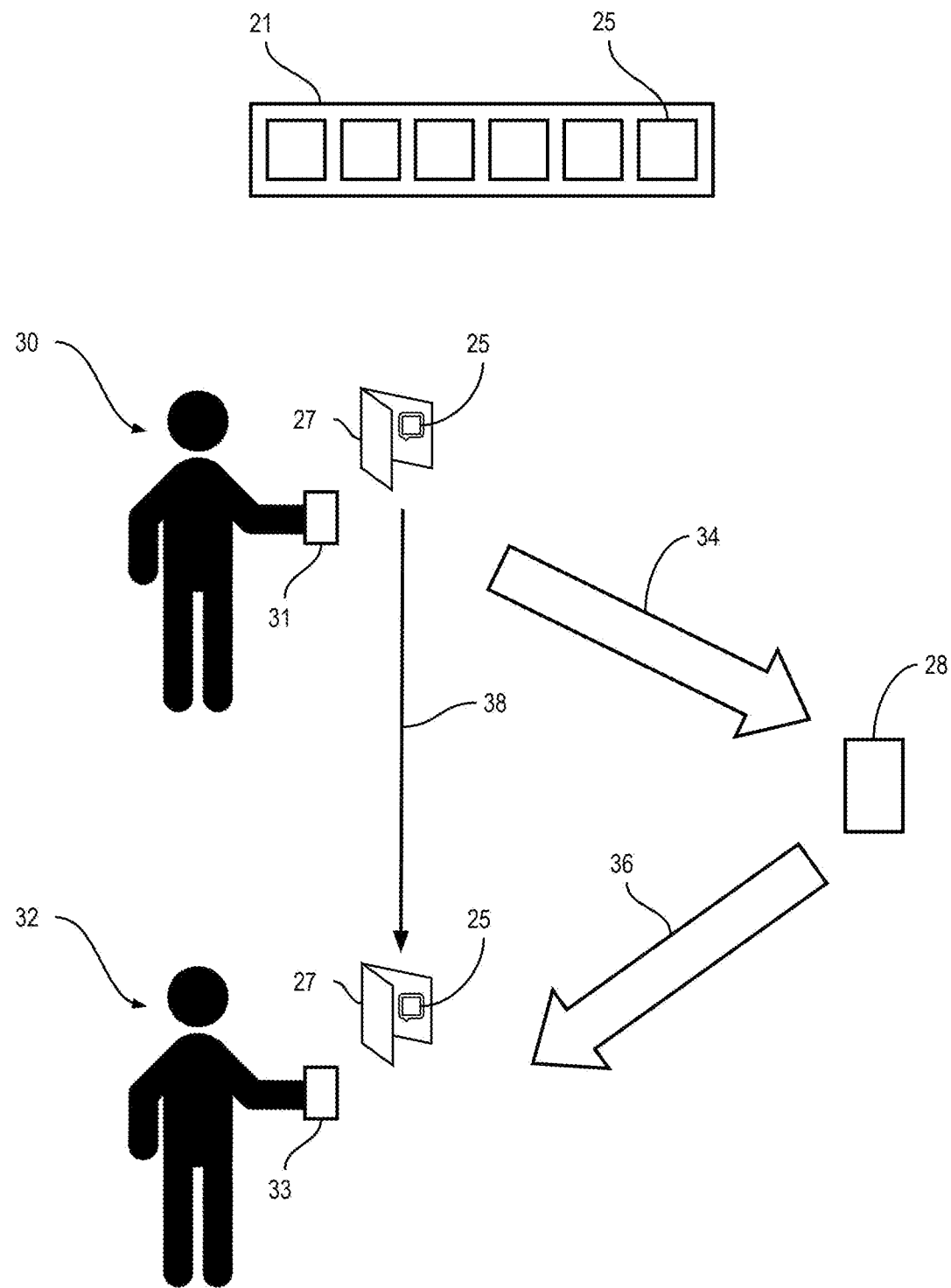
FIG. 5 is a schematic representation of the use of a 2-D bar code with a greeting card.

FIG. 5 schematically depicts the use of a sticker 23 having a 2-D bar code 25 with a conventional greeting card 27. In such an embodiment, a purchaser 30 purchasing a packet 21 and a greeting card 27 would remove the sticker 23 and apply it to the greeting card 27. The purchaser 30 would then scan the 2-D bar code 25 with a smartphone 31, or other suitable device. This would result in an internet browser of the smartphone 31 accessing a specific URL 28 associated with, and only with, the 2-D bar code 25 that was scanned. The purchaser 30 would then be able to record, and/or create a media file using their smartphone while accessing that URL or upload and/or create a prerecorded media file as indicated by arrow 34. After the purchaser 30 finished recording or uploading the media file, the purchaser 30 would save that file and it would become associated with the specific URL 28 associated with the 2-D bar code that had been initially scanned. In an embodiment, after saving the media file, no further media files could be recorded or uploaded to that particular URL and accessing that particular URL would result in the playback of the media file. For example, the purchaser 30 could record a personalized message for a recipient of the greeting card. Access to recording, playback and other functions relevant to media accessible via the specific URL 28 is further discussed herein.

The purchaser 30 would then send the greeting card 27 having the sticker with the 2-D bar code 25 to a recipient 32 as represented by arrow 38 in FIG. 5. After receipt of the greeting card 27, the recipient 32 would then use a recipient's smartphone 33 to scan the 2-D bar code 25. The scanning of the 2-D bar code 25 would result in the internet browser of the recipient's smartphone 33 accessing the URL 28 associated with the 2-D bar code 25 and the media file recorded or uploaded by the purchaser 30 would then be distributed to be played back for recipient 32 as indicated by arrow 36.

It is noted that smartphones typically have operating software that includes a utility function for scanning QR codes and using an internet browser to access a URL associated with that QR code, for example iOS version 11 and higher and Android Version 8 and higher have this capability. For example, a user will typically use a camera of a smartphone to either view or take a photo of a QR code and the phone will then display a URL associated with the QR code. The user will generally then able to simply touch the displayed URL code to access the URL with the default browser of the smartphone. Some phones may use alternative methods of transferring the URL code indicated by a given QR code into the browser of the smartphone.

The website hosting the URL 28 associated with the 2-D bar codes would be configured to interact with a smartphone browser to allow for the recording and/or uploading of a media file and subsequent playback of that media file after it has been saved. An exemplary UI for this operation is further illustrated herein.

The configuration of the hosting website to first record and/or upload the media file and then playback the media file at the same URL was recognized by the inventor as allowing for a single QR code to function both as the means for accessing that URL code for the recording/uploading and the subsequent playback of the media file. Thus a URL which is assigned to a particular sticker may be a one-time use code, which may allow a recording initially which may not be subsequently modified. It is envisioned that other forms of usage of a given QR code and/or URL combination might be employed as further discussed herein.

In the embodiment of FIGS. 1-4, the packet 20 includes a plurality of stickers 22, with the stickers in the packet 20 comprising a distinct QR code 24 printed thereon whereby each sticker/QR code will point to a different URL. As a result, a purchaser of packet 20 will be able to record/upload a different media file for any the stickers/QR codes in packet 20. Thus, the purchaser of the packet 20 will be able to apply each sticker/QR code to a different greeting card and record a personalized message for each sticker/QR code. It is noted that a URL might be accessed by any internet capable device, and thus it may be desirable to prevent unwanted access to a given URL using access rights which are not encoded in a URL which is associated with a given QR code.

While the packet 20 is particularly well-suited for use with greeting cards, a wide variety of other applications are also possible. For example, a real estate agent could find the packet 20 useful. Often times, real estate agents will post a sign in the front yard of a house that has been listed for sale. These signs will often have a container holding multiple copies of a printed single page description of the features of a property. People who see the sign and are interested in learning more about the house will then stop and pick up one of the listing documents from the container. When creating this one page listing, the real estate agent could attach a sticker to the original copy, or scan the sticker and paste its image on a digital version of the listing, and then generate the copies of the document which each have a copy of QR code from the original sticker. These copies would then be placed in the container where interested parties could pick them up, scan the QR code and play back the media file. The real estate agent would record/upload a media file with information about the property for sale, e.g., photographs or video of the interior of the house, using the original sticker/QR code before distributing the copies. Thus the real estate agent would have control of write access privileges to media regarding the property which is accessible via a URL associated with a QR code available via the printed and/or electronically distributed listing materials.

Stickers/QR codes could also be used within a house that is for sale. For example, a message providing detailed information about the kitchen appliances and other features could be associated with a sticker/QR code posted in the kitchen of the house where prospective purchasers could scan it and playback that message.

Real estate agents, and other sales personnel, might also find the use of such stickers/QR codes to be helpful in creating personalized messages directed towards individual potential clients. These stickers/QR codes would then be forwarded to that particular person instead of being placed in a position where a larger number of people would have access to it. For example, the real estate agent might hand a prospective client her business card with a sticker/QR code on the back which is associated with a personalized message for that prospective client. Traceability of a particular channel of distribution of information may be desirable in various forms of advertising, as is well known in the art.

Instead of providing a packet of stickers having 2-D bar codes printed thereon, alternative embodiments might provide an individual a packet of items with a unique 2-D bar code printed thereon. For example, an individual greeting card might be sold with a printed 2-D bar code as an integral feature of the greeting card. Alternatively, a packet containing a plurality of greeting cards, each with a unique 2-D bar code printed thereon is possible.

In yet another embodiment, a plurality of stickers having identical 2-D bar codes could be provided. This embodiment would be useful where a person wants to provide the same message to multiple different people. In such an application the purchaser would first record/upload a media file as described herein and then anytime anyone scanned any of the plurality of identical 2-D bar codes, the media file would be played back. This would be useful in situations such as the use of the use of a bar code with a real estate listing as described herein.

The plurality of identical stickers could also be configured such that their size was suitable for attaching the sticker to the back of a business card and the user would then record/upload a message suitable for general distribution to potential clients that would be associated with the 2-D bar code attached to the business cards. Alternatively, the business cards could come with the QR code pre-printed thereon.

In yet another embodiment, each individual sticker in a packet might have the same 2-D bar code and a second image with a second level code with each of the stickers in the packet having a unique second level code. For example, the second level code could be a number or letter or other distinguishable visual indicia. The first level 2-D bar code would be associated with a web page at a specific URL and the unique second level visual indicia would be associated with a particular sub-page or other subdivision of the first level URL. Second level indicia might be used to determine access rights to various elements of a web site associated with a URL indicated by a visual code. As illustrated in FIG. 2, an auxiliary code 40 might be incorporated into the sticker 22 (FIG. 2). In an embodiment, a second image and/or code 42 might be revealed after the sticker 22 is removed as illustrated in FIG. 3.

Figure 6:
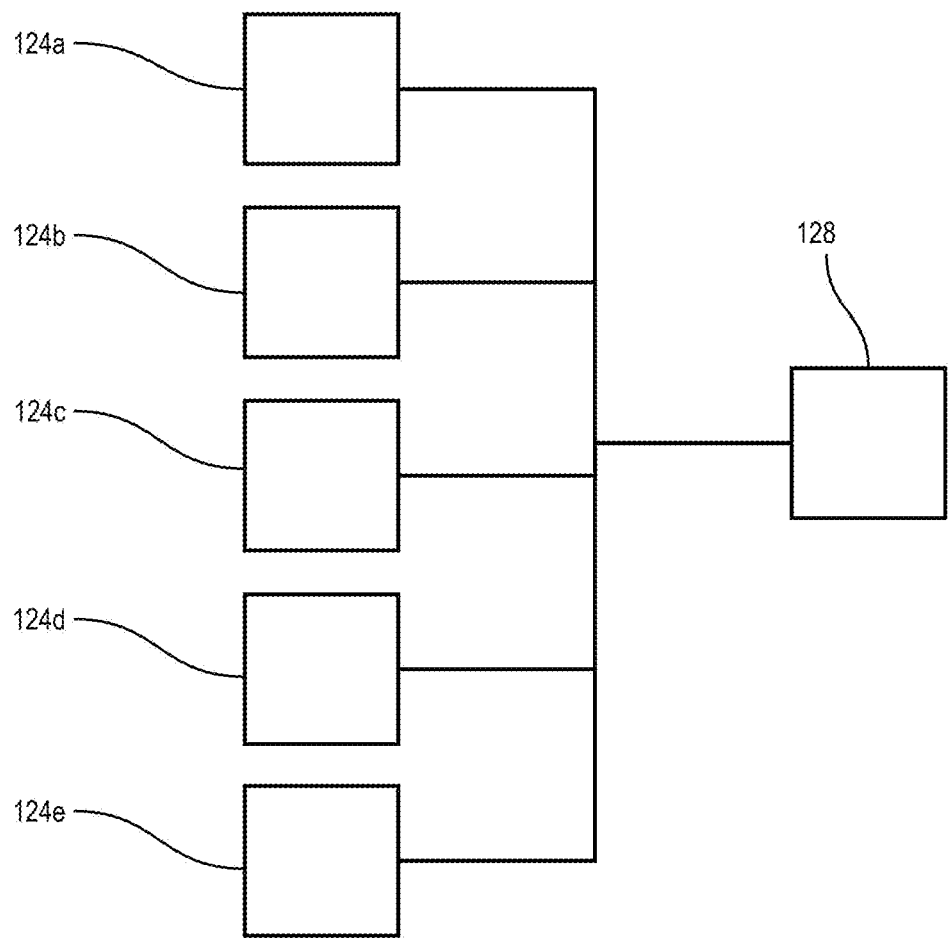
FIG. 6 is a schematic representation of an alternative embodiment wherein a plurality of distinct 2-D bar codes point to the same location.

FIG. 6 schematically represents yet another embodiment. In this embodiment, a packet with a plurality of stickers having a distinct 2-D bar codes 124 (a-e) is provided. The 2-D bar codes 124 allow for the recording or uploading of a media file. The URLs of the plurality of 2-D bar codes 124 are associated with an individual webpage or folder 128 such that each distinct 2-D bar code 124 allows for the recording/uploading of a media file and the collection of these media files will all be present on the same webpage 128 or within the same folder found on a webpage. For example, when accessing the webpage indicated by a top level or index page of the webpage 128 after the media files have been recorded/uploaded, a visitor to the webpage 128 might be presented with a list of the media files in the form of icons that can be clicked to thereby playback the selected one of the media files. URLs and/or secondary data might be used to provide information which is used to create and/or manage an organizational paradigm associated with a group of media files which have been uploaded based on scanning of the bar codes 124.

This "many-to-one" embodiment of FIG. 6 has numerous potential uses. For example, a couple sending out wedding invitations might attach a sticker with one of the 2-D bar codes 124 to each invitation whereby the invited guests might each provide a personalized message to the couple. Alternatively, the couple being married might attach a sticker with one of the 2-D bar codes 124 to each place setting at the wedding reception whereby each guest could then record a personalized message or record the event from their perspective. All of the media files associated with the 2-D bar codes 124 could then be found and played back at a single webpage/folder such as the webpage 128 (FIG. 6).

Figure 7:
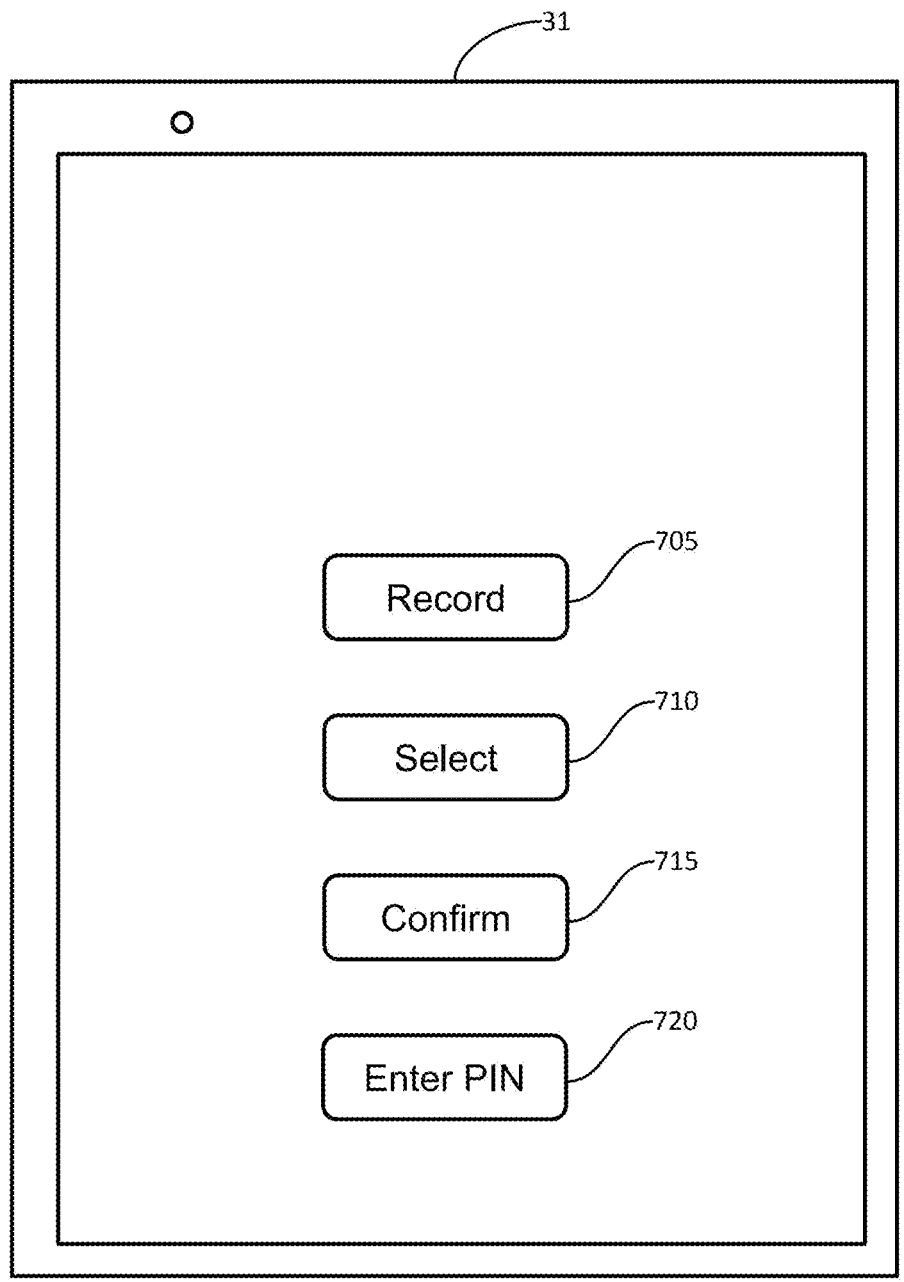
FIG. 7 illustrates an exemplary User Interface (UI) for recording a media file.

This "many-to-one" embodiment is particularly useful for events where it is desired to consolidate the media files of different people associated with an event. In some instances, it may be desirable for attendees of an event to make a recording during the event and/or provide a personal message. In other situations, it may be desirable to provide 2-D bar codes 124 to individuals who are unable to attend an event so that they may record/upload a media file with a message for the hosts and/or attendees of the event. Still other potential uses of such an embodiment are also possible. An exemplary recording interface 700 is depicted in FIG. 7. The recording interface 700 may be provided to a device such as the purchaser smartphone 31 (FIG. 5). The recording interface 700 may comprise a record control 705, an upload control 710, a confirmation control 715 and a security input control 720.

The record control 705 may activate a recording interface of a user device, such as the purchaser smartphone 31 (FIG. 5). For example, a browser might access a camera functionality of a user device, which would record audio and/or video information obtained from hardware of the user device. After completion of a satisfactory recording, a user might be returned to the recording interface 700.

The upload control 710 may activate a file access interface of a user device. For example, a file management functionality of a user device, which would allow a user to select a file from storage of a user device, might be provided. After usage of a file management functionality, a user might be returned to the recording interface 700.

The confirm control 715 may cause a selected media file and/or media produced by a recording interface to be uploaded to a storage facility of a media distribution server and/or other storage. The security input control 720 may be used to provide security information which may be used to determine whether a user has sufficient access privileges to upload a media file and/or may cause a control such as the confirm control 715 to be enabled. Information which is associated with a secondary image such as the secondary image 40 (FIG. 2) and/or the hidden secondary image 42 (FIG. 3) may be provided using the security input control 720. In an embodiment, a sensor input function of a user device may be accessed when the security input control 720 is activated. For example, a camera functionality of a user device might be activated to obtain security information from a source such as a sticker, label, and/or a biometric source, a microphone functionality might be accessed, a Radio Frequency Identification (RFID) functionality of a user device might be accessed, any sensory capability of a user device which may be used to obtain security information may be accessed based on activation of the security input control.

Figure 8:
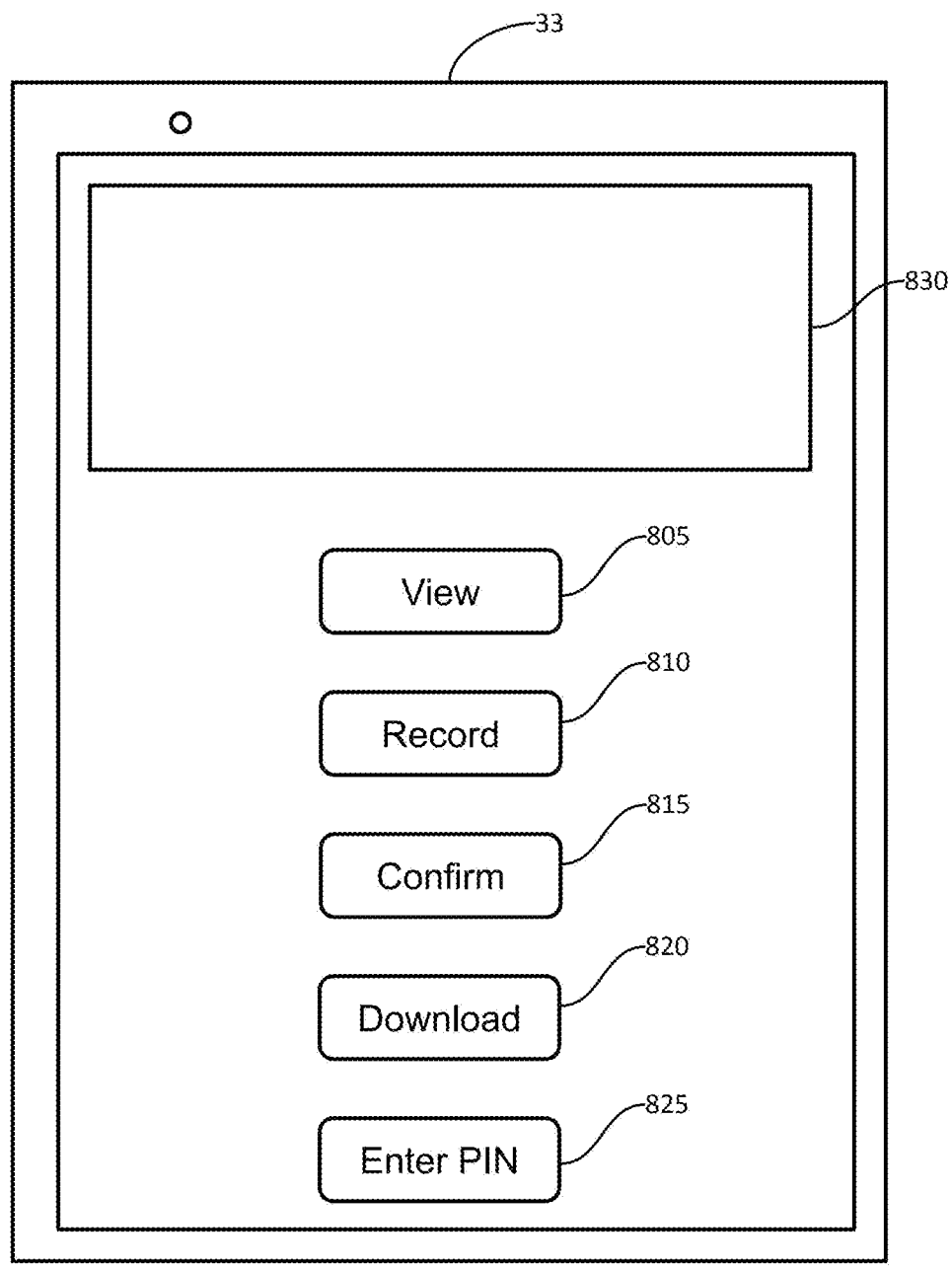
FIG. 8 illustrates an exemplary UI for playback of a media file.

An exemplary playback interface 800 is depicted in FIG. 8. The playback interface 800 may be provided to a device such as the recipient smartphone 33 (FIG. 5). The playback interface 800 may comprise a view control 805, an record control 810, an upload control 815, a download control 820, a security input control 825, and a viewing window 830.

The view control 805 may activate a viewing interface of a user device, such as the recipient smartphone 33 (FIG. 5). For example, a webpage might comprise a media player which would present media to a user when the view control 805 is selected. After completion of viewing, a user might be returned to the recording interface 800.

The record control 810 may activate a recording interface of a user device, such as the recipient smartphone 33 (FIG. 5). For example, a browser might access a camera functionality of a user device, which would record audio and/or video information obtained from hardware of the user device. After completion of a satisfactory recording, a user might be returned to the recording interface 800.

The confirm control 815 may activate a file access interface of a user device. For example, a file management functionality of a user device, which would allow a user to select a file from storage of a user device, might be provided. After usage of a file management functionality, a user might be returned to the recording interface 800.

The download control 820 may activate a file access interface of a user device. For example, a user may be provided with an opportunity to name a file which is to be downloaded, and may be able to select a location at which a file is to be stored. After usage of a file management functionality, a user might be returned to the recording interface 800.

The security input control 825 may be used to provide security information which may be used to determine whether a user has sufficient access privileges to view, upload, download, delete and/or otherwise manipulate a media file and/or may cause a control such as the view control 805, the record control 810, the confirm control 815 and/or the download control 820 to be enabled and/or presented. Information which is associated with a secondary image such as the secondary image 40 (FIG. 2) and/or the hidden secondary image 42 (FIG. 3) may be provided using the security input control 825. In an embodiment, a sensor input function of a user device may be accessed when the security input control 825 is activated. For example, a camera functionality of a user device might be activated to obtain security information from a source such as a sticker, label, and/or a biometric source, a microphone functionality might be accessed, a Radio Frequency Identification (RFID) functionality of a user device might be accessed, any sensory capability of a user device which may be used to obtain security information may be accessed based on activation of the security input control 825.

The viewing window 830 may be used to present information of media which is accessible to a user of the playback interface 800. For example, thumbnails, a file listing, and/or other data regarding media may be provided in the viewing window 830. The viewing window 830 may be used to present information of media which is accessible to a user of the playback interface 800. For example, thumbnails, a file listing, and/or other data regarding media may be provided in the viewing window 830. Access rights determined for a user may affect content which is displayed in the viewing window 830.

Figure 9:
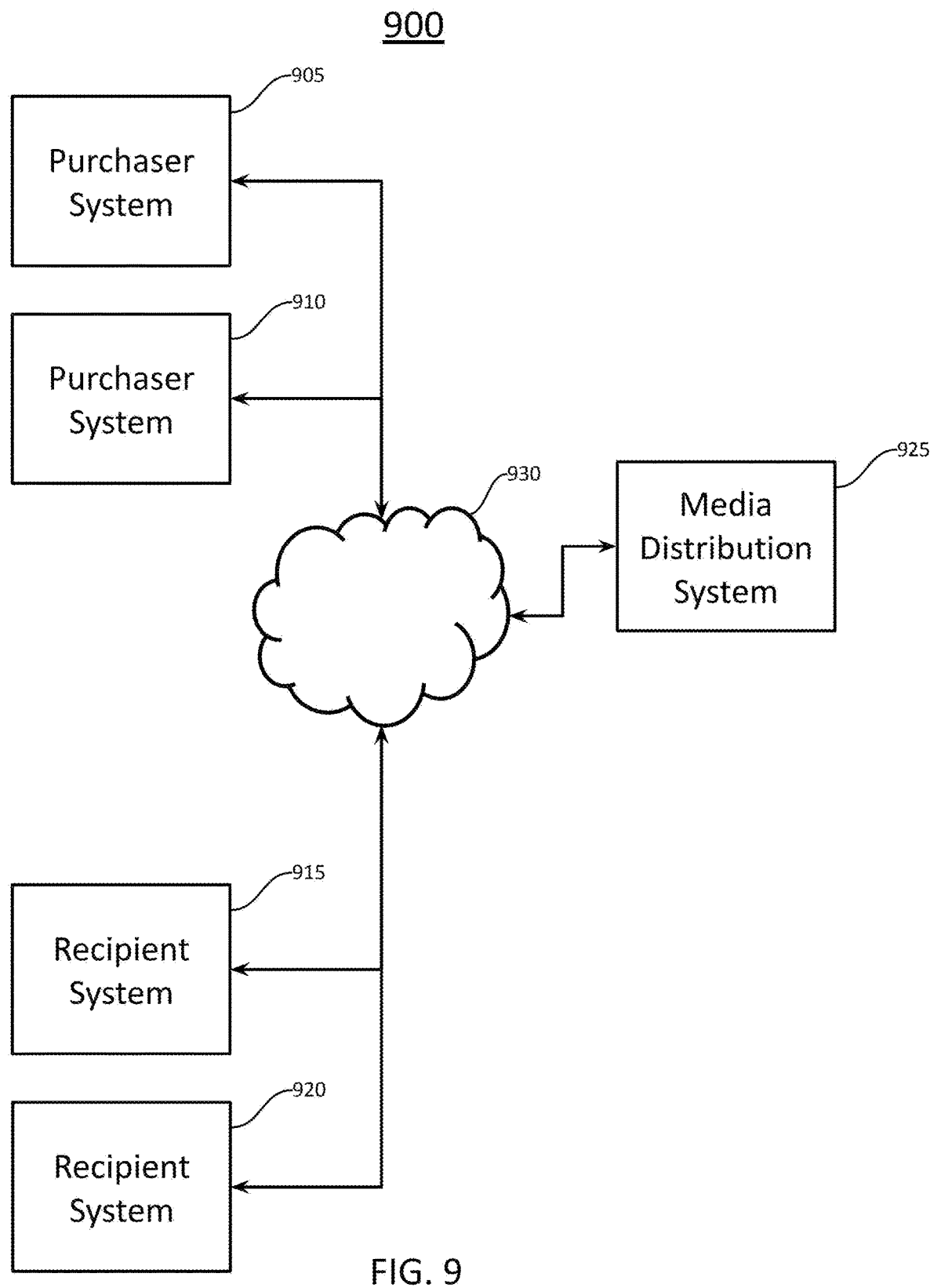
FIG. 9 is a block diagram of an exemplary embodiment of a system for implementing the invention.

An exemplary block diagram of a hardware embodiment for implementing the systems described herein is depicted in FIG. 9. A system 900 is provided which is composed of purchaser systems, 905, 910, recipient systems 915, 920, a media distribution system 925, and a network 930. The purchaser systems, 905, 910 may be implemented as any suitable hardware which incorporates the necessary functionality to obtain and store media, such as a camera, a microphone, a display, a processor, and storage media. For example, a purchaser system may be a smart phone, a tablet, a desktop or portable personal computer, an internet appliance, such as a ChromeBook and/or any device which may readily access a network using internet protocols which are well known in the art. A purchaser system may utilize an operating system such as iOS, Android, Windows, Linux, and/or any suitable software for operating a computing device.

The recipient systems, 915, 920 may be implemented as any suitable hardware which incorporates the necessary functionality to obtain and playback media, a speaker, a display, and a processor. For example, a recipient system may be a smart phone, a tablet, a desktop or portable personal computer, an internet appliance, such as a ChromeBook, a dedicated playback device such as an Aura picture frame, a smart speaker, an internet enabled display device, such as an Amazon FireTV or a Roku receiver, and/or any device which may readily access a network using internet protocols which are well known in the art. A recipient system may utilize an operating system such as iOS, Android, Windows, Linux, and/or any suitable software for operating a computing device.

The media distribution system 925 may be implemented using hardware which is well known in the art. For example, hardware servers which are provided by services such as Amazon Web Services (AWS), Microsoft Azure, and Google Cloud, may be used to implement a media distribution system such as the media distribution system 925. For example, hardware such as that accessible in Amazon EC2 might be used for computational activities of a media distribution system. Storage facilities such as Amazon S3 might be used to store media files which are provided by a media distribution system. Software such as Elemental Media Suite may be used for transcoding of media files by a media distribution system. Networking hardware may include wired, wireless, and/or optical networking which is well known in the art. The media distribution system 925 may run an operating system (OS) such as Microsoft Windows, Linux, and or any suitable operating system. Storage may be incorporated in a media distribution system. For example, a database such as MongoDB, Amazon Dynamo, Cassandra, ElasticSearch or any suitable database may be operative on hardware and/or software of a media distribution system. The media distribution system may provide web pages, which may incorporate JavaScript, Hypertext Markup Language (HTML), and/or other media to devices such as the purchaser systems 905, 910 and the recipient systems 915, 920 via the network 930.

The network 930 may consist of any number of public and/or private networks which may incorporate wired, optical, and/or wireless communications technologies such as 4G and 5G phone services, WiFi, LiFi, and/or any other networking technologies which are able to provide internet protocol communications to suitably connected devices. While only a few purchaser systems, recipient systems are depicted in FIG. 9, it is anticipated that many such devices would be present in a practical system.

Figure 10:
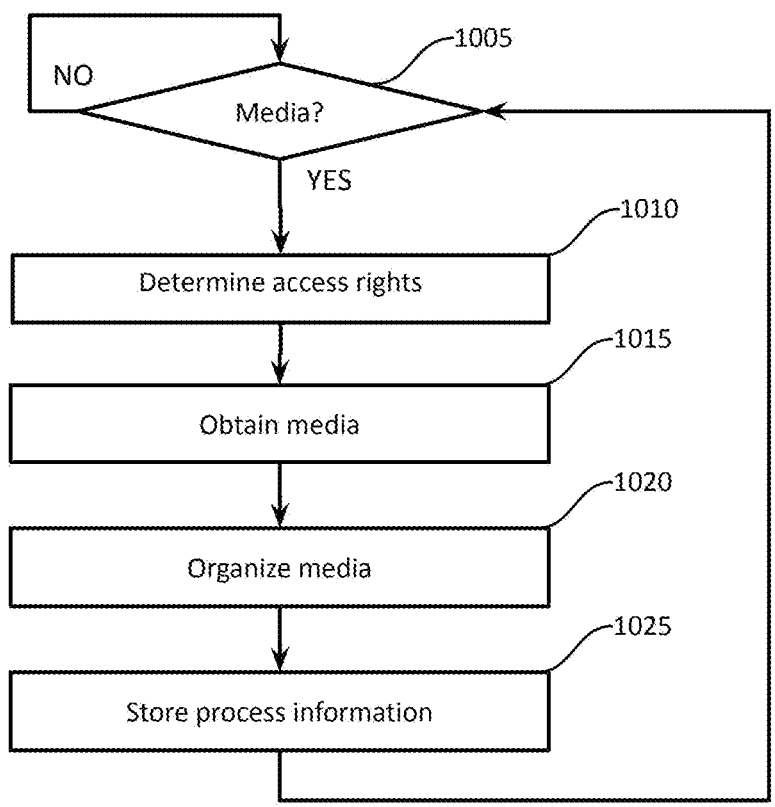
FIG. 10 is a flowchart of storing and modifying media using a visual code.

A process 1000 for responding to a request to store media associated with a label such as the sticker 22 (FIG. 2) is provided in FIG. 10. The process 1000 may be operative in whole or in part on any suitable elements of the system 900 (FIG. 9). In an embodiment, the process 1000 is operative on the purchaser system 905 in a browser functionality of the purchaser system based on a web page which is received from the media distribution system 925.

In operation 1005, a determination is made as to whether a request to store media is received. If in operation 1005 it is determined that a request to store media is not received, control remains at operation 1005 and process 1000 continues. If in operation 1005 it is determined that a request to store media is received, control is passed to operation 1010 and process 1000 continues.

The determination in operation 1005 may be made based on various criteria. In an embodiment, receipt of a URL associated with a QR code, such as the QR code 24 (FIG. 2) by a server associated with the media distribution server 925 may be used to determine that a request to store media is received. In an embodiment, if a URL received at a server associated with the media distribution server 925 has not been activated based on a purchase, it may be determined that a request to store media is not received. In an embodiment detection of a code by a sensor of a device such as the purchaser system 910 may be used to determine that a request to store media is received. Any suitable criteria may be used to determine whether a request to store media has been received.

In operation 1010 access rights associated with a request to store media are determined. Access rights may be determined based on various criteria. In an embodiment, if no media has previously been recorded and/or stored based on a URL received in operation 1005, it may be determined that a request has write privileges for a media file. In an embodiment, if a PIN code associated with a label and/or a URL is correct, it may be determined that a request has write access privileges for media file. In an embodiment, if a number of attempts to access a URL has been exceeded during a predetermined time interval, it may be determined that a request does not have write access privileges for a media file. A browser cookie may be used to determine whether a request has write access privileges for a media file. A URL received in operation 1005 may be used to determine access privileges which are associated with a media file. Any information which may be obtained by a sensor of a user device, such as an image, audio, RFID, GPS coordinates, an IP address, and/or location information may be used to determine access rights associated with a request to store a media file. Control is passed to operation 1015 and process 1000 continues.

In operation 1015 media is obtained. Media may be obtained in any suitable way. A media file recorded by a user device may be obtained via a network such as the network 930 (FIG. 9). Media may be obtained based on a URL provided to a media server such as the media distribution system 925. Media which is stored in a device such as the recipient system 915 may be obtained. Control is passed to operation 1020 and process 1000 continues.

In operation 1020 media is organized. Media may be organized in various ways. For example, a URL associated with a request may be used to determine read access rights associated with a media file. A hierarchical ordering and/or ranking of media may be determined based on a URL and/or secondary information associated with a request. Media may be organized based on access rules, date and time stamps, geographic data, and/or any other suitable metadata which may be associated with a request. For example, browser 'cookies' associated with a request might be used to determine how media files are organized. Control is passed to operation 1025 and process 1000 continues.

In operation 1025 process information is stored. Process information may be stored in any suitable elements of the system 900 (FIG. 9), For example, a browser cookie associated with a browser instance may be modified to indicate process data of a request. Likewise a database associated with the media distribution server 925 may be stored and/or updated to reflect process information of the process 1000. Control is passed to operation 1005 and process 1000 continues.

Figure 11:
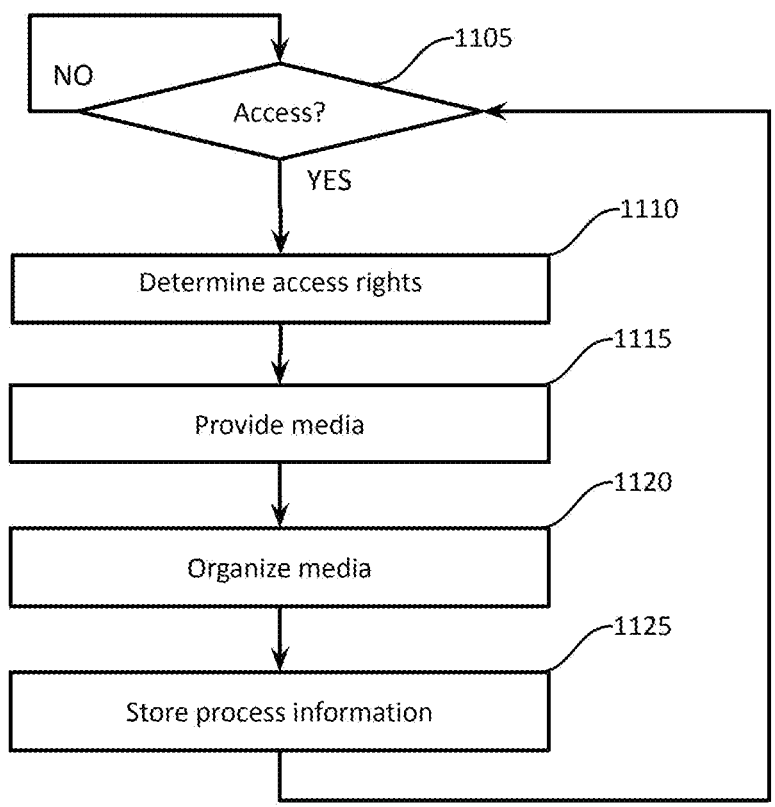
FIG. 11 is a flowchart of accessing stored media using a visual code.

A process 1100 for responding to a request to retrieve media associated with a label such as the sticker 22 (FIG. 2) and/or a URL is provided in FIG. 11. The process 1100 may be operative in whole or in part on any suitable elements of the system 900 (FIG. 9). In an embodiment, the process 1100 is operative on the recipient system 915 in a browser functionality of the recipient system 915 based on a web page which is received from the media distribution system 925.

In operation 1105, a determination is made as to whether a request to access media is received. If in operation 1105 it is determined that a request to access media is not received, control remains at operation 1105 and process 1100 continues. If in operation 1105 it is determined that a request to access media is received, control is passed to operation 1110 and process 1100 continues.

The determination in operation 1105 may be made based on various criteria. In an embodiment, receipt of a URL associated with a QR code, such as the QR code 24 (FIG. 2) by a server associated with the media distribution system 925 may be used to determine that a request to access media is received. In an embodiment, if a URL received at a server associated with the media distribution system 925 has not been activated based on a purchase, it may be determined that a request to access media is not received. Any suitable criteria may be used to determine whether a request to access media has been received.

In operation 1110 access rights associated with a request to access media are determined. Access rights may be determined based on various criteria. In an embodiment, if media has previously been recorded and/or stored based on a URL received in operation 1005, it may be determined that a request has write privileges for a media file. In an embodiment, if a PIN code associated with a label is correct, it may be determined that a request has read access privileges for media file. In an embodiment, if a number of attempts to access a URL has been exceeded during a predetermined time interval, it may be determined that a request does not have read access privileges for a media file. A browser cookie may be used to determine whether a request has read access privileges for a media file. A URL received in operation 1105 may be used to determine access privileges which are associated with a media file. Any information which may be obtained by a sensor of a user device, such as an image, audio, RFID, GPS coordinates, an IP address, and/or location information may be used to determine access rights associated with a request to store a media file. Control is passed to operation 1115 and process 1100 continues.

In operation 1115 media is provided. Media may be provided in any suitable way. A media file stored in a storage device associated with a media distribution server may be provided via a network such as the network 930 (FIG. 9). Media may be obtained based on a URL provided to a media server such as the media distribution system 925. Media may be provided based on a selection made in a web page associated with a URL associated with a request. Media may be provided based on a random selection from a designated group of files selected by a URL, and/or access rights associated with a request. Control is passed to operation 1120 and process 1100 continues.

In operation 1120 media is organized. Media may be organized in various ways. For example, a number of times a media file has been accessed may determine whether a media file is presented for selection. Media may be organized based on access rules, date and time stamps, geographic data, and/or any other suitable metadata which may be associated with a request. For example, browser 'cookies' associated with a request might be used to determine how media files are organized. Control is passed to operation 1125 and process 1100 continues.

In operation 1125 process information is stored. Process information may be stored in any suitable elements of the system 900 (FIG. 9), For example, a browser cookie associated with a browser instance may be modified to indicate process data of a request. Likewise a database associated with the media distribution server 925 may be stored and/or updated to reflect process information of the process 1100. For example, a user action associated with a randomly selected media file may be recorded. Control is passed to operation 1105 and process 1100 continues.

While the embodiments have been described using specific user interface controls, and exemplary components for distribution of the labels, such as stickers and typical web interface components, no limitation is implied thereby. Any equivalent elements which might be used to implement the systems and methods described herein which are known in the relevant art may be used within the scope of the embodiments.

It should be noted that different types of distribution systems of the visual images described herein may be employed. For example, a media file which describes an image might be distributed via media such as email, messaging services such as Multi Media Messaging (MMS), instant messaging systems such as FaceBook Messenger or What's App, and other such communication services.

While the system has been described using QR codes as an exemplary form of machine readable visual input which associates an identifier with an object, no limitation is implied thereby. Visual codes such as Microsoft Tag (High-capacity Color Code), Zap Code (popular in AR domains), Aztec Code, Data Matrix, PDF417, Qrpedia, SnapTag, SPARQCode, and Touchatag might be employed in place of and/or in combination with QR codes. Similarly, RFID codes and/or other systems which may be used to associate a label with an object might be employed within the scope of the embodiments herein.

A system is provided which allows a media file to be associated with a physical object based on a machine readable code which may be attached to the object. A media file may be uploaded, and/or recorded which is accessed using a URL which is mapped to the machine readable code. Access rights associated with a label are determined which may allow a media file to be stored, modified and/or deleted. Access rights may be determined based on supplementary inputs received when a request associated with a label is received.

A request to access a media file associated with a label may be created based on reading of a label. Access rights to a media file may be determined based data provided with an access request. Access rights may be based on inputs which are different from an identifier which is obtained from a label associated with an object. Access to media files may be modified based on information obtained by a user from a label which is encoded with a coding system different from the coding used for creation of an access request. Access rights may be based on historical actions associated with a media file. A media file may be obtained from a device based on a code which associated with an independent object.

A label which includes an identifier of an object may be a part of a group which is designated for a predetermined purpose. A group of labels may permit access a website when scanned, but may have different privileges assigned to members of the group. Access rights associated with a group may be modified based on conditions determined after the labels have been instantiated. A functional response to a label may be modified based on factors such as location, time and/or sensor information obtained by a device which obtains information of the label.

While this system and methods have been described as having an exemplary design, the present embodiments may be further modified within the spirit and scope of this disclosure. This specification is therefore intended to cover any variations, uses, or adaptations of the systems and methods described herein using its general principles.

What is claimed is:

1. A method for providing a response to an identifier comprising:
  receiving a request which comprises the identifier;
  determining an access privilege associated with the request based on a visual indicator rendered with a label which is distinct from a machine readable code rendered on the label which encodes the identifier; and
  providing a media file responsive to the request.

2. The method of claim 1 further comprising:
obtaining the indicator based on a first sensor input which comprises an image of the machine readable code.

3. The method of claim 2 further comprising:
obtaining an image as the first sensor input; and
mapping the identifier to an object based on the indicator and the machine readable code.

4. The method of claim 1 further comprising:
selecting the media file based on the identifier and a URL associated with the request.

5. The method of claim 1 further comprising:
determining the access privilege based on a color of the indicator.

6. The method of claim 1 further comprising:
selecting the media file based on the access privilege.

7. The method of claim 2 further comprising:
selecting the media file based on a biometric input selected based on the machine readable code.

8. The method of claim 1 further comprising:
selecting the media file based on geographic location information associated with the request.

9. The method of claim 1 further comprising:
creating a group of a plurality of unique identifiers comprising the identifier; and
accessing a URL based on receipt of any member of the group; and
providing the response based on a ranking of media based on the access privilege and a source of the media.

10. The method of claim 1 further comprising:
choosing the access privilege based on a type of object selected based on the indicator.

11. The method of claim 1 further comprising:
determining the access privilege based on the indicator wherein the indicator is rendered on a separate substrate from the label encoding the machine readable code.

12. The method of claim 1 further comprising:
selecting the media file based on an input device which detects the identifier.

13. The method of claim 1 further comprising:
selecting the media file based on a count of a number of requests received which comprise the identifier.

14. The method of claim 1 further comprising:
selecting the identifier based on a target object type.

15. The method of claim 1 further comprising:
encoding the identifier as machine readable image;
determining the access privilege based on a unique URL which is associated with the identifier;
allowing write access for the media file when a media file is not associated with the identifier;
allowing read access to the media file when a media file is associated with the identifier;
receiving a media file from a device which submits the request and associating the media file with the identifier when the access privilege is write access;
determining the access privilege based on a color of the indicator;
creating a group of a plurality of unique identifiers comprising the identifier;
providing to a set of media files associated with the group when an identifier of the group is the identifier;
selecting the media file based on a ranking of media based on the access privilege and a source of the media; and
selecting the media file based on a target object type.

16. A system comprising:
a purchaser device receiving a response based on an identifier; and
a media distribution device selecting a media file as the response based on the identifier, and determining an access privilege associated with a request comprising the identifier based on a visual indicator rendered with a label which is distinct from a machine readable code rendered on the label which encodes the identifier.

17. A non-transitory computer readable storage medium storing therein a program for causing a computer to execute an operation comprising:
receiving a request which comprises an identifier wherein the identifier is encoded in a label;
determining an access privilege associated with the request based on a visual indicator rendered with a label which is distinct from a machine readable code rendered on the label which encodes the identifier; and
providing a media file responsive to the request.

18. The computer readable storage medium of claim 17 wherein:
the identifier is associated with a pre-determined class of objects; and
the media file is selected based on a color associated of an image exclusive of the machine readable code rendered on the label which encodes the identifier and the class.

19. The computer readable storage medium of claim 17 wherein:
a group of a plurality of unique identifiers is defined which comprises the identifier; and
a response to the request is provided based on membership of the identifier in the group and a ranking of media based on the access privilege and a source of the media.

20. The computer readable storage medium of claim 17 wherein:
a type of object is associated with the identifier; and
a response to the request is provided based on attributes intrinsic to the type of object.

* * * * *